United States Patent [19]

Schultz et al.

[11] 4,061,624

[45] Dec. 6, 1977

[54] PROCESS FOR PREPOLYMERS AND PRODUCTS

[75] Inventors: William J. Schultz, Vadnais Heights; Samuel Smith, Roseville, both of Minn.

[73] Assignee: Minnesota Mining and Manufacturing Company, St. Paul, Minn.

[21] Appl. No.: 708,914

[22] Filed: July 26, 1976

[51] Int. Cl.² ............................................ C08G 75/18
[52] U.S. Cl. ............................ 260/79.3 M; 260/2 D; 260/79.3 R; 260/873; 428/457
[58] Field of Search ............ 260/2 D, 79.3 R, 79.3 M

[56] References Cited

U.S. PATENT DOCUMENTS

| 3,644,567 | 2/1972 | Smith et al. ........................ 260/2 D |
| 3,824,197 | 7/1974 | Smith et al. ........................ 260/2 D |
| 3,824,198 | 7/1974 | Smith et al. ........................ 260/2 D |
| 3,824,219 | 7/1974 | Smith et al. ..................... 260/79.3 R |
| 3,824,220 | 7/1974 | Smith et al. ..................... 260/79.3 R |

*Primary Examiner*—Ronald W. Griffin
*Attorney, Agent, or Firm*—Cruzan Alexander; Donald M. Sell; Temple Clayton

[57] ABSTRACT

Process for preparing linear terminally differentially electrophilically reactive prepolymers by reacting cyclic ethers or lactones comprising a major proportion of tetramethylene oxide with an initiator represented by the asymmetrical structure $$YO_mSO_2R_nQ,$$

wherein
Q is a first radical which in anionic form is a non-terminating anion in the polymerization of tetramethylene oxide;
Y is a second radical, free from alkylatable groups, selected from alkyl, alkaryl, aryl, aralkyl and cycloalkyl and having the free valence on a carbon atom devoid of halogen atoms;
$n = 0$ or $1$;
$m = 0$ or $1$; and
R is a divalent bridging radical comprising at least one oxyalkylene radical $—(OR')_q$ where $q$ is 1 to 300 and preferably 1 to 50, and R' is alkylene of 2 to 10 carbon atoms, at least half being $C_4H_8$.

The differentially electrophilically reactive prepolymers have different reactivity at the two ends so that successive reagents can react with the two ends to give product prepolymers having two unlike terminations. Such product prepolymers can provide segmented copolymers having utility as adhesives, elastomers and protective coatings.

3 Claims, No Drawings

PROCESS FOR PREPOLYMERS AND PRODUCTS

This invention relates to initiators for the polymerization of tetramethylene oxide alone or in combination with cationically polymerizable lactones or cyclic ethers. This invention further relates to the process for said polymerization and to the terminally differentially electrophilically reactive prepolymeric products thereof.

In the polymer field considerable effort has been expended in an attempt to provide prepolymeric materials having a high degree of reactivity. Such reactivity is particularly desirable to permit modification of physical and chemical properties, e.g., to improve the adhesion of the polymer to metals and glass, to carry out further chemical reactions such as simple substitution, crosslinking, chain extension, graft and block copolymerization, etc. These efforts to achieve the desired reactivity in the prepolymer molecule have met with limited success.

Such reactive prepolymers include those of Smith and Hubin, U.S. Pat. Nos. 3,824,197 and 3,824,220. These prepolymers characteristically react at each end at room temperature or below, e.g., with alkylatable compounds such as $NH_3$, amines, alcohols, mercaptans, phenols and alkali metal salts thereof to yield symmetrically substituted product prepolymers having at each end the residue of the alkylatable compound. The product prepolymers react with equal facility at all ends with whatever reagent may be employed, e.g., polyepoxides, acyl or diacyl chlorides, polyisocyanates, to produce unique vulcanizates or segmented, chain-extended polymers. It is one object of this invention to provide new and useful prepolymers, particularly prepolymers having a high degree of terminal, differential electrophilic reactivity.

Another object of this invention is to provide prepolymeric alkylating agents.

Yet another object of this invention is to provide novel terminally differentially functionally substituted prepolymers.

It is also an object of this invention to provide methods for the preparation of block copolymers and resins useful in the preparation of chain-extended and cured products.

Other objects and advantages of this invention, as well as the characteristics of the polymers and processes of this invention, will be apparent hereinelsewhere.

In accordance with these and other objects of the invention, process is provided for the preparation of linear terminally differentially electrophilically reactive prepolymers of tetramethylene oxide with 0 up to 50 mol% of comonomeric cationically polymerizable lactone or cyclic ether which process comprises effecting polymerization of said tetramethylene oxide and said comonomeric lactone or cyclic ether at −20° to 80° C with initiator represented by the asymmetrical structure $YO_mSO_2R_nQ$ wherein Q is a first radical which in anionic form is a non-terminating anion in the polymerization of tetramethylene oxide;

Y is a second radical, free from alkylatable groups, selected from alkyl, alkaryl, aryl, aralkyl, and cycloalkyl and having the free valence on a carbon atom devoid of halogen atoms;

$n = 0$ or 1; $m = 0$ or 1 and

R is a divalent bridging radical comprising at least one oxyalkylene radical $-(OR')_q$ where $q$ is 1 to 300 and preferably 1 to 30 and R' is alkylene of 2 to 10 carbon atoms, at least half of R' being $C_4H_8$.

It will be understood that the term asymmetric means that the radicals $YO_mSO_2$ and Q are different. The term unsymmetric is also read with the same meaning.

Preparation of the prepolymers of the invention by the process of the invention is carried out in the liquid phase using tetramethylene oxide (tetrahydrofuran), with or without comonomers, at temperatures of −20° to 80° C in the substantial absence of chain-terminating agents. Generally solvents are not necessary although inert solvents, i.e., free from alkylatable groups, and nonpolymerizable by acidic initiators may be desirable in amounts up to about 10% by weight to moderate the rate of reaction or to facilitate manipulation of the reaction mixture. Suitable solvents include $CH_2Cl_2$, fluorohalocarbons, cycloalkanes, nitrobenzene, nitroalkanes and the like.

The molecular weight of the prepolymer depends upon the molar ratio of initiator to monomer. A mole ratio of about 0.001 to 0.01 generally provide polymers of relatively high molecular weights, i.e., 15000 and higher. Molecular weights below 15000 are generally more readily obtained using mole ratios of 0.01 to 0.5. Higher mole ratios are not useful for producing prepolymers.

The terminally differentially electrophilically reactive prepolymers of the invention are characterized by their reaction with ammonia which produces polymers having single terminal primary amino groups in 5 minutes or less when a two-fold molar excess of ammonia and a temperature of 25° C. or lower is employed. The terminally differentially electrophilically reactive prepolymers of the invention may also be characterized by their ability to initiate the polymerization of tetramethylene oxide monomer at 25° C., as evidenced by an increase in the molecular weight of the polymer resulting from the attachment of recurring oxytetramethylene groups to one end of the original terminally differentially electrophilically reactive prepolymer with full retention of the other end group.

The term "electrophilically reactive" is herein used to connote reactivity in alkylation of alkylatable groups whereas the term "cationically reactive" is used for the special case wherein alkylation proceeds rapidly under mild conditions. As an illustration of a cationically reactive compound, the electrophilically reactive compound (not of the invention)

$CH_3OC_4OSO_2CF_3$ reacts with n-butylamine (an alkylatable compound) under mild conditions, i.e., room temperature 15° to 25° C., to form $CF_3SO_2OH + CH_3OC_4H_8NHC_4H_9$.

The acid is, of course, neutralized in the presence of base.

Alkylatable groups can react with an RQ moiety of the initiator or prepolymer molecule. They can be characterized by their ability to be methylated by methyl trifluoromethansulfonate. Typical alkylatable groups include —NH (amino or imino), —OH, —SH, ONa, etc. Prepolymers of the invention possess two electrophilically reactive terminal groups, only one of which reacts in a typical alkylation reaction at room temperature and is specifically termed "cationically reactive." The other reactive group will undergo similar reactions but only under more vigorous conditions and hence the two groups are differentially electrophilically reactive.

By "linear prepolymer" is meant a relatively long chain solvent soluble, i.e., not cross-linked, prepolymer which may have substituent groups attached to the main chain but such substituent groups are generally of substantially lesser chain length than the main chain, normally less than half of the length of the main chain.

Certain cationically polymerizable monomers may be converted directly to substantially linear terminally differentially electrophilically reactive prepolymers by reaction with initiators of the formula $YO_mSO_2R_nQ$. Tetramethylene oxide yields a differentially electrophilically reactive polyether having recurring oxytetramethylene groups and is particularly preferred. Terminally differentially electrophilically reactive polyether copolymeric prepolymers can be prepared, for example, from tetramethylene oxide (tetrahydrofuran) and a minor amount (i.e., less than one half or 50 mole percent) of another cationically polymerizable or copolymerizable monomer, (e.g. cyclic ethers such as ethylene oxide, propylene oxide, 3,3-bis(chloromethyl)oxetane, 1,3-dioxolane; epichlorohydrin; lactones such as ε-caprolactone, δ-valerolactone, β-propiolactone. The use of a comonomer in oxytetramethylene prepolymers is desirable at times to lower the melting point of the terminally differentially electrophilically reactive polyethers, as well as to improve the low temperature flexibility of derivatives prepared therefrom.

Initiators for the polymerization are characterized by the structure

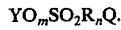

$YO_mSO_2R_nQ$.

As hereinabove stated, Q represents a radical which in ionic form is a non-terminating anion in the polymerization of tetramethylene oxide. A non-terminating anion is defined as an anion which does not significantly affect the molecular weight or amount of polymer produced when added as a salt to a polymerizing tetramethylene oxide/Lewis acid system. For example, tetramethylene oxide containing about 2 mol% of ethylene oxide and 2 mol% of $BF_3$ will be converted in 24 hours at 20° C to a system containing at least 50% polymer. The same reaction mixture additionally containing 2 mol% of a soluble salt of a non-terminating anion will yield substantially the same amount of polymer. In contrast, the presence of 2 mol% of a soluble salt of a terminating anion, such as LiBr or silver trifluoroacetate, results in a yield of 10% or less of polymer. Useful anions corresponding to Q radicals include $FSO_3^{31}$, $CF_3SO_3^-$, $ClO_4^-$, $AsF_6^-$, $SbF_6^-$ and $PF_6^-$.

One particularly preferred class of non-terminating Q radicals is that derived from extremely strong protonic acids, such as $R_fCF_2SO_3-$, where $R_f$ is fluorine or a fluorinated saturated monovalent aliphatic radical of from 1 to 20 or more carbons which may be straight, branched or, if sufficiently large, cyclic and may be interrupted by divalent oxygen atoms or trivalent nitrogen atoms bonded only to carbon atoms. $R_f$ may also contain hydrogen and other halogen atoms, such as chlorine, in addition to fluorine which other atoms must be attached to carbon atoms other than the carbon atoms attached to O or N. Preferably $R_f$ is at least half fluorinated, i.e., at least about half of the monovalent atoms appended to the carbon atoms of the $R_f$ group are fluorine. Illustrative $R_f$ groups in addition to F include

| | |
|---|---|
| trifluoromethyl, | 1,1,2,2-tetrafluoroethyl, |
| pentafluoroethyl, | 2,hydro-hexafluoropropyl, |
| heptadecafluorooctyl, | 8-chloro-perfluorooctyl, |
| undecafluorocyclohexyl, | etc. |

Y is a monovalent radical of 1 to 18 carbon atoms free from alkylatable groups selected from alkyl, alkaryl, aryl, aralkyl and cycloalkyl and having the free valence on a carbon atom devoid of halogen atoms. Suitable $YO_mSO_2^-$ groups include $CH_3SO_2-$, $CH_3OSO_2-$, $C_{12}H_{25}SO_2-$, $C_{18}H_{37}OSO_2-$, $CH_3C_6H_4SO_2-$, $C_{10}H_7SO_2-$, $C_6H_5OSO_2-$, $C_6H_5CH_2SO_2-$ and $C_6H_{11}SO_2-$. Thus, the following compounds illustrate useful initiators in the practice of this invention. $CH_3SO_2-O_3SF$, $CH_3SO_2-O_3SCF_3CH_3SO_2-OC_4H_8-O_3SC_4F_9$, $CH_3OSO_2-OC_4H_8-O_3SC_4F_9$, $C_6H_5SO_2-O_3SCF_3$, $C_6H_5SO_2+SbF_6^-$, $C_6H_5CH_2OSO_2O_3SCF_3$, $CH_3C_6H_4SO_2O_3SCF_3$.

The homopolymeric product of the reaction of initiator and tetramethylene oxide may be represented as $YO_mSO_2-(OC_4H_8)_q-Q$ in which $q$ is an integer greater than 1, preferably between 3 and 300. This product is further characterized by the fact that one end group (i.e., $YO_mSO_2O$) is an ester and is affixed to the polymer through a bond that has covalent characteristics only. The other end group (i.e., $OC_4H_8Q$) is characterized by a degree of ionicity in that this end group is constituted, at least in part, by the $Q^-$ anion bonded through an oxonium ion end group, as shown:

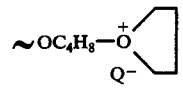

If $Q^-$ is the non-terminating complex anion of a strong Lewis acid, e.g., $SbF_6^-$, then this end group is characterized by being primarily ionic in character. If $Q^-$ is the anion derived from a protic acid of the type discussed above, e.g., $CF_3SO_3^-$, then this end group may be characterized as having both covalent and ionic character, as more fully discussed in S. Smith and A. J. Hubin, J. Macromol. Sci. — Chemistry, A7, 1399–1413 (1973) and in K. Matyjaszewski. P. Kubisa and S. Penczek, J. Polymer Sci., Chemistry 13, 763–784 (1975).

The prepolymers of this invention are distinguished from the dicationically active prepolymers of U.S. Pat. No. 3,824,220 in that in the present case the prepolymers are cationically active at only one end (that corresponding to the Q end group). The present prepolymers therefore exhibit differential reactivity of the end groups toward various nucleoophilic reagents which enables the preparation of prepolymers in which essentially each polymer chain contains one end group having a specific functionality (e.g., primary amine) while the other end group has an entirely different functionality (e.g., hydroxyl). A preparation of this type can readily be accomplished by reaction of the terminally differentially electrophilically reactive prepolymer of this invention, first under weakly nucleophilic conditions to effect reaction only with the Q end groups and then with a more strongly nucleophilic reagent which is capable of reaction with the $YO_mSO_2$ end groups. Similarly, the selection of mild reaction conditions, e.g., temperatures of −15° to +25°, will favor nucleophilic displacement of Q groups only; while the second reaction under more stringent conditions. e.g., temperatures of 50°–100° C., can effect displacement of the $YO_mSO_2$ groups.

Inorganic and organic compounds (including polymeric materials) containing alkylatable groups, particularly compounds containing —OM, —$CO_2$M, —SM, —$SO_3$M, and —NMR' groups (M is H, $NH_4$, alkali metal or alkaline earth metal; R' is hydrogen, alkyl or aryl), readily react with the Q group and much less readily with the $YO_mSO_2$ group of the terminally differentially electrophilically reactive prepolymers of this invention because these reactions are essentially alkylation reactions in which the M moiety of the alkylatable compound is replaced by the $YO_mSO_2R_n$ group of the prepolymer. Suitable alkylatable compounds include water, hydrogen sulfide, ammonia, urea, hydrazine, aniline, methyl amine, mercaptoethanol, glycolic acid, polymers of acrylic acid, vinyl alcohol polymers, succinic acid, glycine, proteins, piperazine, triethylene tetramine, ethylene glycol, etc., as well as the salts thereof. The products of this alkylation reaction are thus the acid QH or a salt thereof and, in the case of monofunctional alkylatable compounds, the corresponding product prepolymer. Di- and polyfunctional alkylatable compounds lead to chain extended and highly branched polymers, respectively. In many cases an acid acceptor is desirable to neutralize the strong acid, QH. Neutralization is frequently necessary to avoid undesirable side reactions. In instances where an acid acceptor is desired, e.g., the alkylation of an alkyl mercaptan, pyridine can be used to advantage, preferably in stoichiometric amounts. In the alkylation of amino compounds, including amines and ammonia, an excess of amino compound may be used to neutralize the product acid.

Temperatures for alkylation reactions are generally not critical, and a range between about −80° C. to 100° C. has been found to be suitable for reaction of the Q moiety, although the lower temperatures (e.g., below 25° C) are generally preferred to moderate the rate of reaction; for subsequent reaction of the $YO_mSO_2$ moiety, temperatures of 25°–150° C. are useful. The use of an inert solvent is not always necessary and is, in some cases, undesirable. Suitable inert solvents include cyclohexane, nitromethane, chloroform and other such solvents which are free of alkylatable groups although salts of strongly nucleophilic reactants, e.g., phenoxide, can be used in moderately reactive solvents such as ethanol. For alkylation reactions involving the $YO_m$-$SO_2$ moiety polar inert solvents such as dimethylformamide, dimethylsulfoxide, nitromethane and dimethoxyethane are suitable.

The terminally differentially electrophilically reactive prepolymers of this invention also react with numerous metal salts of terminating anions (e.g., potassium cyanate, lithium bromide, etc.) to effect a double decomposition reaction, the products being the polymer terminated by the salt anion and the salt of the Q anion; under more drastic conditions the $YO_mSO_2$ can be replaced similarly. Salts of alkali metals, e.g., lithium iodide, sodium cyanide, potassium cyanate, sodium bisulfide, sodium bisulfite, monosodium adipate, disodium succinate, potassium acid phthalate, sodium phenoxide, etc., are preferred, particularly when very soluble in the reaction medium, although salts such as silver cyanide can also be used. Such reactions may be conducted either in homogeneous solutions or in heterogeneous dispersions. These reactions are one preferred method for obtaining certain derivatives of the differentially electrophilically reactive prepolymer.

It is generally not necessary to prepare and isolate the terminally differentially electrophilically reactive prepolymers of the invention as separate and distinct steps. Frequently the prepolymers of the invention are employed in the preparation of high molecular weight polymers which are valuable per se, as is true in the preparation of polytetramethylene oxide from tetrahydrofuran. The use of the initiation process of this invention affords a very simple and economical means for preparing this extremely useful prepolymer from the monomer. However, the terminally differentially electrophilically reactive prepolymers most often find use in the preparation of segmented copolymers. For example, a prepolymer of the invention in which there are about 10 recurring oxytetramethylene units is reacted with a half molar amount of low molecular weight carboxy-terminated polyethylene terephthalate at room temperature to yield an ABA block copolymer. The ends of the ABA block copolymer bear $YO_mSO_2$ groups which are then replaced by acrylate groups by reaction of the copolymer with trimethylammonium acrylate at about 100° C to yield a bis acrylate terminated linear block copolymer which can be applied to a metallic surface and photopolymerized thereon by conventional procedures to form a flexible cross-linked insoluble, protective coating.

The novel products and processes described herein find utility in the preparation of plastic and protective coating compositions, elastomers, polymeric surface active agents, impregnants, binders, potting compositions, adhesives, fibers, tape backing, foams and films.

EXAMPLE 1

This example describes the preparation of

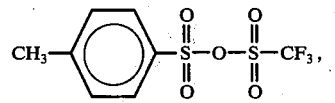

an initiator in the process of the invention. The procedure used is a slight modification of the procedure of Effenberger and Huthmacher, Angew. Chem., Vol. 86, page 409-10, 1974.

In a 120 cc bottle were placed 2.4 g. of $CF_3SO_3Ag$, 1.6 g. of p-toluenesulfonyl chloride and 20 g. of nitromethane and the resulting mixture placed on a shaker overnight at about 20° C. The following morning the white precipitate of AgCl was filtered from the solution and the solution containing $CF_3SO_3SO_2C_6H_4CH_3$ (in which Q is $CF_3SO_3$) was added to 125 grams of tetramethylene oxide and polymerization permitted to proceed at 25° C for 5 hours. This reaction produced a very viscous solution containing $CH_3C_6H_4SO_2(OC_4H_8)_qO_3SCF_3$.

The solution was poured into 300 ml of tetramethylene oxide saturated with $NH_3$ at 0° C and stirred for 30 minutes which warmed spontaneously to give $CH_3C_6H_4SO_2(OC_4H_8)_qNH_2$. The solution was placed in a sealed pressure vessel and reacted at 75° C for 16 hours to give $H_2NC_4H_8(OC_4H_8)_{q-1}NH_2$. 73 grams of polymer was obtained from this reaction. The polymer was shown by gel permeation chromatography (GPC) to have a number average molecular weight of approximately 13,000. An amine titration indicated the polymer had an amine equivalent weight of 6,200, thus a poly(oxytetramethylene) diamine was obtained in which $q$ was 170 to 180.

EXAMPLE 2

In a 50 ml flask, 25.7 grams of $CF_3SO_3Ag$ and 11.4 grams of $CH_3SO_2Cl$ were mixed and stirred at 40° C for 4 hours, and then fractionated under reduced pressure. A low boiling fraction boiling at 35° C. ($CH_3SO_2Cl$) was discarded. Twenty-one grams of mixed anhydride, $CH_3SO_2OO_2SCF_3$, having a boiling point of 56° C. at approximately 3 torr, was recovered. 3.2 grams of this mixed anhydride was added to 250 grams of anhydrous tetramethylene oxide and allowed to polymerize 5 hours at room temperature to give $CH_3SO_2(OC_4H_8)_qOSO_2CF_3$. The prepolymer of the invention was terminated by adding 20 grams of a 20% solution of $NaOC_2H_4NH_2$ in ethanol. The mixture was stirred 16 hours at 55° C. to give $H_2NC_2H_4(OC_4H_8)_qOC_2H_4NH_2$. The product prepolymer was purified by centrifuging and separating the alcohol layer from the polymer solution. The product prepolymer was shown to have a molecular weight of approximately 15,000 and an amine equivalent weight of 7,010 in which $q$ is about 190.

EXAMPLE 3

In a modification of the procedure of G. A. Olah and H. C. Lin, Synthesis, No. 5, May, 1974, p. 343, approximately 100 ml of sulfur dioxide was condensed into a 250 ml. flask cooled with a dry ice/alcohol bath. Twenty-one grams of antimony pentafluoride was added and dissolved. Seventeen grams of p-toluenesulfonyl fluoride was added to this solution. A white precipitate (AgCl) formed immediately. The product was purified by repeated washing with liquid sulfur dioxide. The product was the initiator:

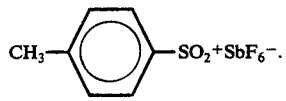

A solution of 5.6 grams of the above initiator 250 grams of tetramethylene oxide and 44 grams of cyclohexane was prepared and reaction allowed to proceed at 20° C for 1½ hours. The viscous solution containing a prepolymer of the invention, i.e., $CH_3C_6H_4SO_2.(OC_4H_8)_q+SbF_6-$, was converted to the amine-terminated polymer as in Example 1.

Under similar conditions there was no evidence of polymer formation after one week at room temperature in the presence 5 g. of p-toluene sulfonic acid rather than the above initiator.

EXAMPLE 4

In a 250 ml. flask fitted for stirring heating and cooling were placed 5.75 g. $CH_3SO_2OSO_2CF_3$ and 150 g. tetramethylene oxide. Reaction commenced spontaneously and continued for 2 hours at 25° C to give $CH_3SO_2(OC_4H_8)_qOSO_2CF_3$. The reaction mixture was poured into a saturated solution of $NH_3$ in tetramethylene oxide and allowed to stand for 30 minutes at 25° C to form $CH_3SO_2(OC_4H_8)_qNH_2$.

Excess $NH_3$ was removed at about 15 torr and 25° C and to the resulting solution was added 16 g. sodium phenoxide in 40 ml. tetramethylene oxide. The solution was transferred to a liter screw-capped glass bottle and heated at 100° C for 16 hours. The resulting solution containing $C_6H_5(OC_4H_8)_qNH_2$ was diluted in 3 l. of water and the residual product prepolymer collected and washed repeatedly with water. Air dried prepolymer was 104 g. having an amine equivalent (by perchloric acid titration) of 5900 and phenoxy equivalent weight (by proton nuclear magnetic resonance) of 5700. This corresponds to a value of $q$ of about 80.

What is claimed is:

1. Process for the preparation of linear terminally differentially electrophilically reactive prepolymer of tetramethylene oxide with 0 up to 50 mol% of comonomeric cationically polymerizable lactone or cyclic ether which comprises effecting polymerization of said tetramethylene oxide and said comonomeric lactone or cyclic ether at −20° to 80° C with initiator represented by the asymmetrical structure $$YO_mSO_2R_nQ$$

wherein Q is a first radical which in anionic form is a nonterminating anion when 2 mol% of a dissolved salt of said anion is present during the polymerization of tetramethylene oxide containing 2 mole percent of ethylene oxide and 2 mol% of $BF_3$ as polymerization initiator at 20° C and said polymerization provides at least about 50 percent conversion of said monomers to polymer;
  Y is a second radical free from alkylatable groups, selected from alkyl, alkaryl, aryl, aralkyl and cycloalkyl and having the free valence on a carbon atom devoid of halogen atoms;
  $n = 0$ or 1;
  $m = 0$ or 1 and
  R is a divalent bridging radical comprising at least one oxytetramethylene radical, $—(OR')_q—$ where $q$ is 1 to 300 and R' is alkylene of 2 to 10 carbon atoms at least one half of said alkylene groups being $C_4H_8$.

2. As a composition of matter a compound represented by the structure:

$$YO_mSO_2(OR')_qQ$$

wherein,
  Q is a first radical which in anionic form is a non-terminating anion when 2 mol% of a dissolved salt of said anion is present during the polymerization of tetramethylene oxide containing 2 mole percent of ethylene oxide and 2 mol% of $BF_3$ as polymerization initiator at 20° C and said polymerization provides at least about 50 percent conversion of said monomers to polymer;
  Y is a second radical free from alkylatable groups, selected from alkyl, alkaryl, aryl, aralkyl and cycloalkyl and having the free valence on a carbon atom devoid of halogen atoms;
  $m = 0$ or 1;
  $q = 1$ to 300;
  R' is alkylene of 2-10 carbon atoms of which alkylenes at least one half are $C_4H_8$.

3. A composition of matter according to claim 2 represented by the formula $$CH_3SO_2(OC_4H_8)_qOSO_2CF_3$$

where $q$ is from about 80 to 190.

* * * * *